United States Patent
Andersen et al.

(10) Patent No.: US 12,166,354 B2
(45) Date of Patent: Dec. 10, 2024

(54) PHOTOVOLTAIC SYSTEM WITH ENERGY STORAGE AND METHOD OF CONTROLLING THE SYSTEM

(71) Applicant: Lithium Balance A/S, Smorum (DK)

(72) Inventors: Michael A. E. Andersen, Lyngby (DK); Ziwei Ouyang, Lyngby (DK); Zhe Zhang, Lyngby (DK); Kevin Thomas Manez, Lyngby (DK)

(73) Assignee: Lithium Balance A/S, Smorum (DK)

( * ) Notice: Subject to any disclaimer, the term of this patent is extended or adjusted under 35 U.S.C. 154(b) by 0 days.

(21) Appl. No.: 18/039,197

(22) PCT Filed: Dec. 15, 2021

(86) PCT No.: PCT/EP2021/085907
§ 371 (c)(1),
(2) Date: Jun. 23, 2023

(87) PCT Pub. No.: WO2022/129178
PCT Pub. Date: Jun. 23, 2022

(65) Prior Publication Data
US 2023/0420944 A1    Dec. 28, 2023

(30) Foreign Application Priority Data

Dec. 15, 2020  (EP) ..................................... 20214267

(51) Int. Cl.
*H02J 3/28*    (2006.01)
*H02J 7/35*    (2006.01)

(52) U.S. Cl.
CPC ...... *H02J 3/28* (2013.01); *H02J 7/35* (2013.01); *H02J 2207/20* (2020.01); *H02J 2300/26* (2020.01); *H02J 2310/12* (2020.01)

(58) Field of Classification Search
CPC .. H02J 3/28; H02J 7/35; H02J 2207/20; H02J 2300/26; H02J 2310/12
See application file for complete search history.

(56) References Cited

U.S. PATENT DOCUMENTS

| 2005/0006958 | A1* | 1/2005 | Dubovsky | ............... | H02J 3/381 |
| | | | | | 307/64 |
| 2011/0133558 | A1* | 6/2011 | Park | .......................... | H02J 3/32 |
| | | | | | 307/66 |
| 2014/0203649 | A1 | 7/2014 | Cheek et al. | | |

FOREIGN PATENT DOCUMENTS

| EP | 3346578 A2 | 7/2018 |
| EP | 3624292 A1 | 3/2020 |
| WO | WO2010088545 A2 | 8/2010 |
| WO | WO2017117484 A1 | 6/2017 |
| WO | WO2022129178 A1 | 6/2022 |

OTHER PUBLICATIONS

Extended European Search Report mailed May 17, 2021 for European Patent Application No. 20214267.5, 10 pages.
PCT Search Report and Written Opinion mailed Apr. 7, 2022 for PCT Application No. PCT/EP2021/085907, 10 pages.

* cited by examiner

*Primary Examiner* — Carlos Amaya
(74) *Attorney, Agent, or Firm* — Lee & Hayes, P.C.

(57) ABSTRACT

The present invention relates to a system for electrical energy storage. More specifically, the system comprises an energy storage retrofitted to an existing photovoltaic system. The present invention further relates to a method for control such a system for electrical energy storage.

15 Claims, 6 Drawing Sheets

PHOTOVOLTAIC SYSTEM WITH ENERGY STORAGE AND METHOD OF CONTROLLING THE SYSTEM

CROSS-REFERENCE TO RELATED APPLICATIONS

This application is a U.S. National Phase Application filed under 35 U.S.C. § 371, based on International Patent Application No. PCT/EP2021/085907, filed on Dec. 15, 2021, which claims the priority of EP Application No. 20214267.5, which was filed on Dec. 15, 2020, each of which is incorporated by reference herein in its entirety.

FIELD OF THE INVENTION

The present invention relates to a system for electrical energy storage. More specifically, the system comprises an energy storage retrofitted to an existing photovoltaic system. The present invention further relates to a method for control such a system for electrical energy storage.

BACKGROUND OF THE INVENTION

The power production of photovoltaic (PV) panels is, obviously, depending on the light conditions the panels are exposed to. This often results in that the power production is timewise out of timing with the need for power by e.g. a household to which the power is supplied. In many implementations, this inherent problem is solved by connecting a photovoltaic system to an AC grid so that a surplus of electrical power produced by the photovoltaic system is provided to the AC grid and when the household is in need of more power than provided by the photovoltaic system, such power is provided by the AC grid.

Another issue for a PV system without storage is that when PV generate too much power, which grid cannot take, then PV inverter have to stop working, otherwise, the voltage at grid coupling point will increase and might trigger grid protection. Therefore, with storage, the extra power generated by PV but cannot absorbed by grid can be saved.

While such a set-up provides a workable solution, it is often less energy effective compared to if a surplus of electrical power produced by the photovoltaic panels was stored e.g. locally at the household and such stored power was used when the household is in need of more power than provided by the photovoltaic system.

When considering installing an electrical power storage facility, it is realized that such a storage facility requires a DC current and if implemented on the AC side of the photovoltaic system, the storage requires an AC-to-DC converter and an intricate implementation to work properly together with the AC-grid and the household.

It could therefore seem to be a feasible way to implement the electrical storage at the DC-side of the photovoltaic system (between the photovoltaic panels and the DC-to-AC converter). However, implementing an electrical storage in this manner has been found to hamper or even destroy an effective operation of the photovoltaic system since the operation is typically based on a Maximum Power Point Tracking (MPPT) algorithm and the storage will represent a drain or addition of current not as such accounted for in the implementation of the MPPT algorithm. The result of this is non-optimal performance of the photovoltaic system and in worst case, a failure of the MPPT control.

Such an endeavour to include an electrical storage is made even further problematic, when the desire is to retrofit an electrical storage to a photovoltaic system designed and constructed without such a storage, as in such instances one would seek to make least interventions on the photovoltaic system or even no change/modification on the installed photovoltaic systems at all.

Hence, an improved photovoltaic system would be advantageous, and in particular a more efficient and/or reliable electrical storage in a photovoltaic system would be advantageous.

OBJECT OF THE INVENTION

It is a further object of the present invention to provide an alternative to the prior art.

In particular, it may be seen as an object of the present invention to provide a photovoltaic system that solves the above-mentioned problems of the prior art.

In particular, it may be seen as an object of the present invention to provide a retrofittable electrical storage.

SUMMARY OF THE INVENTION

Thus, the above described object and several other objects are intended to be obtained in a first aspect of the invention by providing a photovoltaic system, the system may comprise
a photovoltaic panel that may have an output terminal for outputting current produced by the photovoltaic panel;
a DC-to-AC converter that may have an input terminal for inputting DC current and an output terminal for outputting AC current;
a bidirectional DC-to-DC converter that may have a first terminal for in-/outputting DC current and a second terminal for in-/outputting DC current;
an electrical storage;
a control system;
wherein the
output terminal of the photovoltaic panel may be in electrical connection with the input terminal of the DC-to-AC converter, said DC-to-AC converter may be configured for extracting power from a photovoltaic panel based on a maximum power point tracking (MPPT) algorithm;
the first terminal of the bidirectional DC-to-DC converter may be electrical connected with the photovoltaic panel and with the DC-to-AC converter, and the second terminal of the bidirectional DC-to-DC converter may be electrically connected with the electrical storage, so as to provide a current drain from or a current surplus to a current flowing from the photovoltaic panel to the DC-to-AC converter by either charging or discharging the electrical storage through the bidirectional DC-to-DC converter;
the bidirectional DC-to-DC converter may be configured for controlling the current direction through based on a control signal from by the control system and the control system may be configured to determine the power delivered by DC-to-AC controller, and configured to determine the power delivered to the a load electrical connected at the output terminal of the DC-to-AC controller, and based on said determinations, assuring that the power may be delivered at the output terminal of the DC-to-AC controller by controlling said current direction through the DC-to-DC converter to either charging or discharging the electrical storage, so that if the electrical storage has a state of charge larger than a predetermined discharging setting point, and said power delivered to the load is larger than the power delivered by the DC-to-AC converter then discharge the electrical storage;

if the electrical storage has a state of charge smaller than a predetermined charging setting point and the power delivered by the DC-to-AC converter is larger than said power delivered to the load then charge the electrical storage.

The invention may preferably be implemented in a manner wherein, the DC-to-DC controller may be controlled during charging and discharging of the electrical storage in manner so that voltage potential at the first terminal preferably may be set to be essentially equal to the voltage potential at the output terminal of the photovoltaic panel.

Discharging setting point and charging setting points are numbers larger than zero and are typically defined or determined by a user. Determinations may be based on empirical research during use of a system according to the invention preferably made with the aim of minimizing use of power from the grid.

The invention is particularly, but not exclusively, advantageous for obtaining a photovoltaic system with electrical storage, such that power extracted from a photovoltaic panel can be stored in an electrical storage for later use.

In a preferred embodiment, the DC-to-DC converter, the electrical storage, and the control system are retrofitted in an existing PV system, where an MMPT control algorithm controls the DC-to-AC controller of the existing system. By the addition of the DC-to-DC converter, the electrical storage and the control system, the MMPT control algorithm is left unchanged.

In a preferred embodiment, the bandwidth of the bidirectional DC-to-DC converter may be larger than the bandwidth of the maximum power point tracking (MPPT) algorithm.

In a preferred embodiment, the output terminal of the DC-to-AC converter may be electrically connected to a load, such as a household.

Connecting the output terminal of the DC-to-AC converter to load can be advantageous. In such a system, the photovoltaic panel(s) can deliver power to a household or other types of energy requiring systems. Based on the specifications of the photovoltaic panel(s), there may be times where the energy supplied by the photovoltaic panels is insufficient to meet the demand from the load, such that an energy storage fitted to the system will be advantageous to supply the system with energy.

In a preferred embodiment, the output terminal of the DC-to-AC converter may be electrically connected to an AC grid such as a supply grid.

Connecting the output terminal of the DC-to-AC converter to an AC grid can be advantageous. In such a system, the photovoltaic panel(s) can deliver power to a supply grid, when the demand for energy in the system is lower than the supply by the photovoltaic panel(s). Thereby, the system is capable of supplying other loads, such as other households, when they are connected to an electrical system, such as one connected to the AC grid, when the demand for energy in the photovoltaic system is lower than the supply by the photovoltaic panel(s).

In a preferred embodiment, the control system may further be configured for, by controlling the current direction through the bidirectional DC-to-DC converter, provide a current drain from current flowing from the photovoltaic panel to the DC-to-AC converter and charge the electrical storage, if the power delivered by the DC-to-AC converter is larger than the load, and the state of charge (SOC) of the electrical storage is smaller than 100%, or is smaller than a predefined maximum state of charge (SOC) setting point.

A control system is an advantage in photovoltaic systems to control the current direction through the bidirectional DC-to-DC converter. Such a control system can provide based on control signals, a current drain from the current flowing from the photovoltaic panel to the DC-to-AC converter, when the power delivered to the DC-to-AC converter is larger than the demand from the load and the state of charge of the electrical storage is smaller than a predefined maximum state of charge.

In a preferred embodiment, the controller may be configured to determine the state of charge (SOC) of the electrical storage determine the amount of power consumed by the load from the AC grid provide a surplus of current to the current flowing from the photovoltaic panel to the DC-to-AC converter by setting the current direction of the bidirectional DC-to-DC converter to discharge the electrical storage, if the state of charge is larger than zero and/or larger than a predefined minimum state of charge (SOC) setting point and if power is consumed by the load from the AC grid.

In a preferred embodiment, the controller may be configured to determine a power-balance of the system, by calculating the amount of current required by the system and the amount of current supplied by the output terminal of the photovoltaic panel discharge the electrical storage if the power-balance is larger than zero or/and larger than a predefined power-balance minimum charge the electrical storage if the state of charge (SOC) is lower than 100% or is smaller than a predefined maximum state of charge (SOC) setting point and the power-balance of the system is less than zero or/and less than predefined power-balance minimum.

Having a controller capable of determine the state of charge of the electrical storage and the amount of power consumed by the load from the AC grid is advantageous in many situations. One situation may be to discharge the electrical storage based on control signals and provide a flow of current from the electrical storage when the state of charge is larger than a predefined minimum and the power consumed by the load from the AC grid is larger than zero. In some situations, it may even be preferable to determine a power-balance of the system, such that a minimum predefined demand of power from the load and the converters are needed before the electrical storage is activated to provide a surplus of current to the current flowing or to charge the electrical storage.

In a preferred embodiment, the output terminal of the photovoltaic panel may be in electrical connection with the input terminal of the DC-to-AC converter by an electrical connection and wherein the first terminal of the bidirectional DC-to-DC converter may be electrical connected with said electrical connection.

In a preferred embodiment, the bidirectional DC-to-DC converter, the energy storage and control system may form an energy storage system locally retrofitted on a photovoltaic power production facility.

In a preferred embodiment, the control system may be configured to determine current at the first and/or second terminal of the bidirectional DC-to-DC converter.

In a second aspect of the invention by providing a photovoltaic system, the method may comprise The individual aspects of the present invention may each be combined with any of the other aspects. These and other aspects of the invention will be apparent from the following description with reference to the described embodiments.

BRIEF DESCRIPTION OF THE FIGURES

The present invention and in particular preferred embodiments thereof will now be described in more detail with regard to the accompanying figures. The figures show ways of implementing the present invention and are not to be construed as being limiting to other possible embodiments falling within the scope of the attached claim set.

DETAILED DESCRIPTION OF PREFERRED EMBODIMENTS

Figure 1:
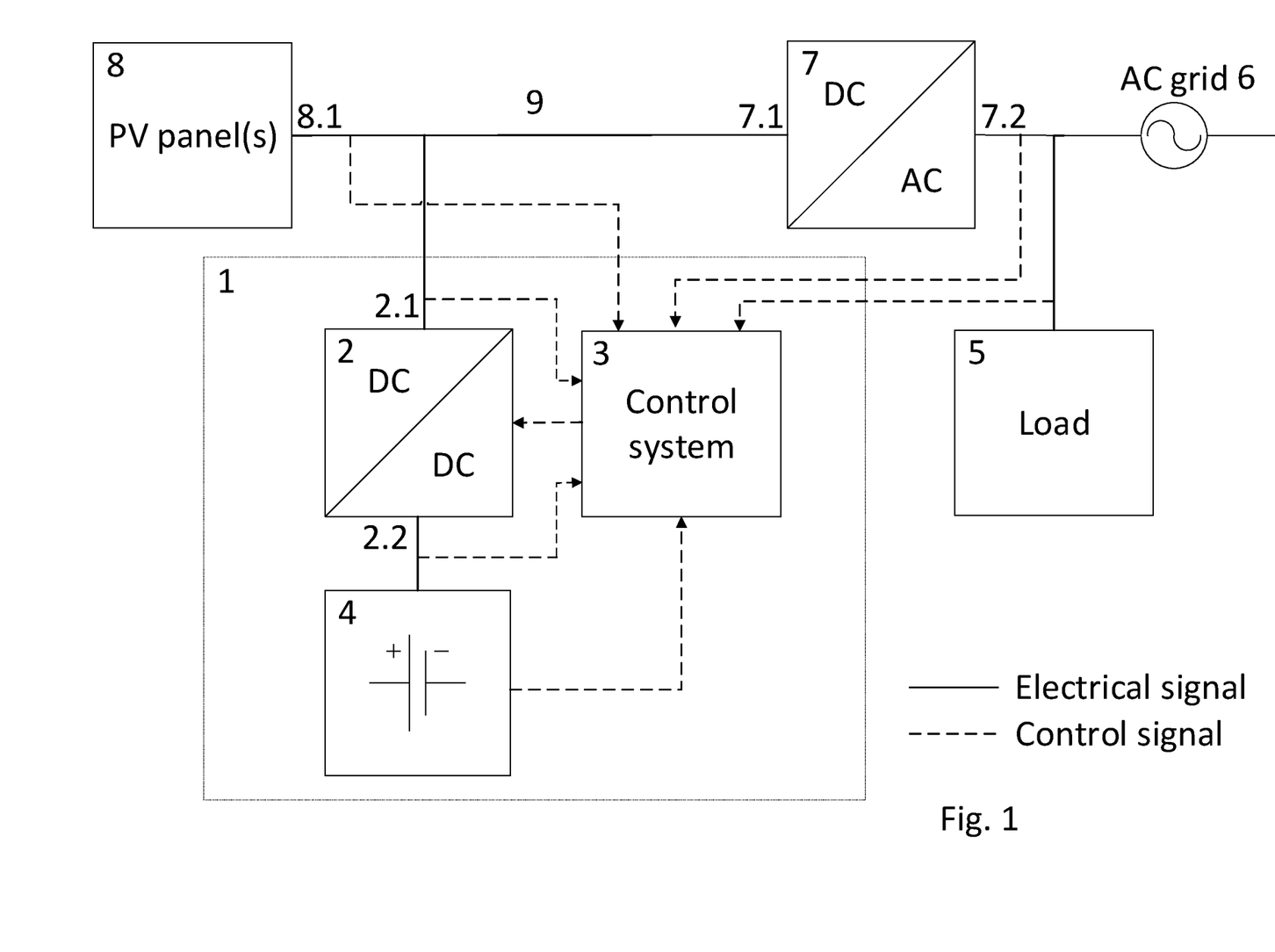
FIG. 1 schematically illustrates a photovoltaic system according to a first embodiment of the invention, FIG. 2 schematically illustrates general curves shapes for i (current) vs V (voltage) in FIG. 2A and P (power) vs V (voltage) in FIG. 2B

Reference is made to FIG. 1 schematically illustrating a photovoltaic system in a first embodiment. The photovoltaic system is illustrated conceptually with boxes representing physical components. The photovoltaic system has photovoltaic panel 8 which could be a photovoltaic panel arranged on a roof or wall of a house. However, the actual positioning of the panel can be chosen as per desire as long as the panel is arranged so that it is exposed to light for producing electrical current. The photovoltaic panel has an output terminal 8.1 for outputting current produced by the photovoltaic panel 8.

A DC-to-AC converter 7 having an input terminal 7.1 is connected to the photovoltaic panel 8, typically by suitable wires, for inputting DC current from the photovoltaic panel 8. The input terminal 7.1 is also connected to receive current from a storage as will be detailed below. The DC-to-AC converter 7 also has an output terminal 7.2 for outputting AC current provided by the converter by converting the DC current to AC current.

A bidirectional DC-to-DC converter 2 is also provided. The bidirectional DC-to-DC converter 2 has a first terminal 2.1 for in-/outputting DC current and a second terminal 2.2 for in-/outputting DC current. That is, when current is input on one terminal the other is an output terminal and vice versa.

An electrical storage 4 is also provided. The electrical storage may be a battery and/or capacitor or other suitable storage facilities for storing electrical power.

As one measure of the invention is to control the current flow in the system, a control system 3 is provided. This control system is typically a computer implemented control system which receives input from sensors providing control signals representative of parameters such as state of charge, current and/or load. The control system 3 in case of computer implemented has a program running which based on the signals generates control signal to elements of the system to set such element in a desired mode of operating.

As illustrated in FIG. 1, the output terminal 8.1 of the photovoltaic panel 8 is in electrical connection with the input terminal 7.1 of the DC-to-AC converter. The DC-to-AC converter 7 being configured for extracting power from a photovoltaic panel 8 based on a maximum power point tracking (MPPT) algorithm. Thus, the DC-to-AC converter 7 is an active component typically comprising a CPU and software configuring it to carry out the MPPT algorithm and operating the extraction of power in accordance therewith. It noted that although the DC-to-AC converter is illustrated as a single component, is may be divided into several components connected to exchange data, power and/or control signals.

The first terminal 2.1 of the bidirectional DC-to-DC converter 2 is electrical connected with the photovoltaic panel 8 and with the DC-to-AC converter. Again, such connection may be provided by suitable wires. The second terminal 2.2 of the bidirectional DC-to-DC converter 2 is electrically connected with the electrical storage 4. As the bidirectional DC-to-DC converter is bidirectional, current can flow to or from the storage 4, so as to provide a current drain from or a current surplus to a current flowing from the photovoltaic panel 8 to the DC-to-AC converter by either charging or discharging the electrical storage 4 through the bidirectional DC-to-DC converter.

To control the direction of current flow through the bidirectional DC-to-DC 2, the converter 2 is configured for controlling the current direction based on a control signal from the control system 3.

The control system 3 is configured to determine the power delivered by DC-to-AC converter 7 and configured to determine the power delivered to a load 5 electrical connected at the output terminal 7.2. And, on the basis of these determinations assuring that the power is delivered at the output terminal 7.2 of the DC-to-AC converter 7 by controlling said current direction through the DC-to-DC converter 2 to either charging or discharging the electrical storage 4, so that if the electrical storage 4 has a state of charge larger than a predetermined discharging setting point, and said power delivered to the load 5 is larger than the power delivered by the DC-to-AC converter then discharge the electrical storage 4;

if the electrical storage 4 has a state of charge smaller than a predetermined charging setting point and the power delivered by the DC-to-AC converter is larger than said power delivered to the load 5 then charge the electrical storage 4.

Thus, by such a system, it may be controlled whether power at the output terminal 7.2 of the DC-to-AC controller comes from the photovoltaic panel 8 alone, contains a surplus from the storage 4 or solely from the storage 4. Further, the storage facility does not as such requires that changes are to be made to the DC-to-AC converter 7, as what is required is an electrical connection connecting the bidirectional DC-to-DC converter with the electrical connection between the photovoltaic panel 8 and the DC-to-AC converter 7. Thereby even existing photovoltaic systems may easily be retrofitted with a storage capacity.

Figure 2A:
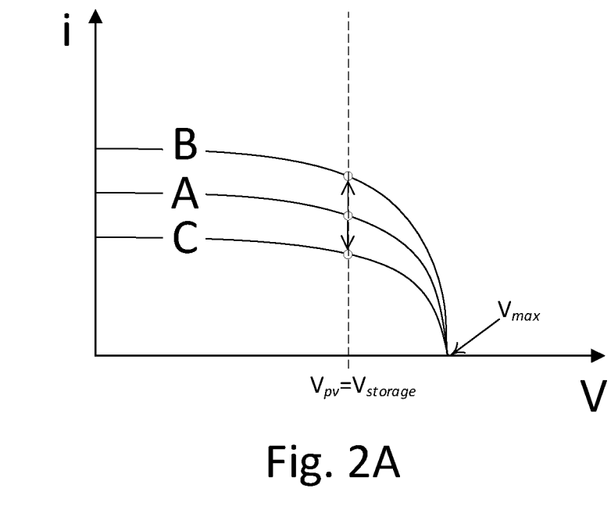
Figure 2B:
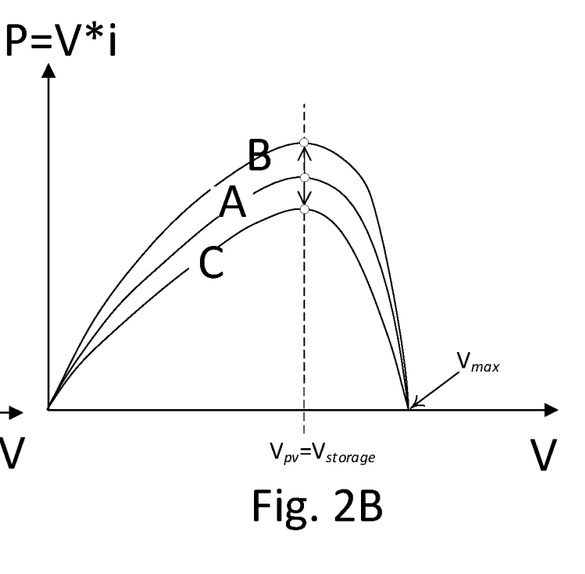

Preferred embodiments of the present invention may be seen as if the electrical storage 4 together with the DC-to-DC converter 2 are operated as an apparent proportional PV panel. To better understand this concept, the following two examples are provided with reference to FIGS. 2A and 2B. In FIGS. 2A and 2B the curves labelled "A" is an operation state where the electrical storage 4 is neither charged or discharged. Kindly observe, that the curves presented in FIGS. 2A and 2B represent general curve shapes, not necessarily resembling data points obtained by measurements.

Situation B: Discharge of Electrical Storage

At the point in time where the electrical storage is to discharge, the the DC-to-DC converter is controlled to provide a current from the electrical storage in the following manner:

$$V_{storage}=V_{pv} \text{ and } i_{storage}=k \cdot i_{pv} \text{ where } k>0$$

Where subscript storage refers to the electrical storage 4, subscript pv refers to the PV panels. V refers to voltage and i refers to current.

This means that the total power provided by the PV panels and the electrical storage is:

$$P_{total}=P_{pv}+P_{storage}=V_{pv} \cdot i_{pv}+V_{pv} \cdot k \cdot i_{pv}=V_{pv} \cdot i_{pv}(1+k)$$

By this, it can be seen that discharge of the electrical storage 4 is equivalent to an apparent larger PV panel or apparent larger solar irradiation. Thus, the DC-to-AC converter 7 configured for extracting power from the PV panels 8 based on the MPPT algorithm does not recognise that the electrical storage 4 delivers power, as the electrical storage 4 in combination with the DC-to-DC converter 2 acts as if they were a PV panel. Thereby, the DC-to-AC converter will continue operating in the PV panels MPP (maximum power point).

This is illustrated in Fig. I and II by the arrow indicating the operation points (indicated by circles) moves from curve A to curve B.

To prevent malfunction of the DC-to-AC converter 7 it may be necessary to control the power such that the total power does not exceed the rated power for the DC-to-AC converter.

Situation C: Charge of Electrical Storage

At the point in time where the electrical storage is to charge, the DC-to-DC converter 2 is controlled to provide a current to the electrical storage in the following manner:

$$V_{storage}=V_{pv} \text{ and } i_{storage}=k \cdot i_{pv} \text{ where } k<0$$

This means that the total power provided by the PV panels 8 and the electrical storage 4 is:

$$P_{total}=P_{pv}+P_{storage}=V_{pv} \cdot i_{pv}+V_{pv} \cdot k \cdot i_{pv}=V_{pv} \cdot i_{pv}(1+k)$$

By this it can be seen that charge of the electrical storage 4 is equivalent to an an apparent smaller PV panel or apparent smaller solar irradiation. Thus, the DC-to-AC converter 7 configured for extracting power from the PV panels based on the MPPT algorithm does not recognise that the electrical storage extract power, as the electrical storage with the DC-to-DC converter acts as if they were a PV panel. Thereby, the DC-to-AC converter will continue operating the PV panel in its MPP (maximum power point).

This is illustrated in Fig. I and II by the arrow indicating the operation points (indicated by circles) moves from curve A to curve C. As can be seen from these figures, the DC-to-DC converter 2 is controlled during charging and discharging of the electrical storage 4 in manner so that voltage potential at the first terminal is set to be essentially equal to the voltage potential at the output terminal (8.1) of the photovoltaic panel 8.

It may be necessary to include a step controlling that the total power "delivered" to the DC-to-AC converter 7 does not becomes negative, as the DC-to-AC converter 7 preferably can not provide power backwardly (AC-to-DC).

As presented herein, the load 5 may receive power from the DC-to-AC converter and from the grid 6. Further, the electrical storage 4 is discharged if the power delivered to the load 5 is larger than the power delivered by the DC-to-AC converter, that is the grid 6 top-ups power in case the PV panels cannot produce sufficient power to meet the demand by the load 5. From this, the value of k may be determined on the basis of that the total power delivered by the AC-to-DC converter advantageously should be equal to or as close as possible the power received by the load 5 taking into consideration the charging state of the electrical storage 4. Similarly, the electrical storage 5 is charged if the power delivered by the DC-to-AC converter to the load 5 is larger than power delivered to the load 5, that is the PV panel provides a surplus of power compared to the need of the load 5. Also in this case, the value of k can be determined on the basis of that the total power delivered by the DC-to-AC converter 7 advantageously should be equal to or as close possible to the power consumed by the load 5 taking into consideration the charging state of the electrical storage.

Further examples are present below with reference to FIGS. 3-5.

In order to provide an efficient operation of the photovoltaic system, the bandwidth of the bidirectional DC-to-DC converter 2 is preferably larger than the bandwidth of the maximum power point tracking (MPPT) algorithm.

As illustrated in FIG. 1, the output terminal 7.2 of the DC-to-AC converter is electrically connected to a load 5, such as a household. The type of load as such is not critical for the invention, since it is envisaged that any load can be connected as long it is a load consuming electrical power.

As further illustrated in FIG. 1, the output terminal 7.2 of the DC-to-AC converter is electrically connected to an AC grid 6 such as a supply grid. Thereby the photovoltaic system may send electrical power out into the AC grid 6 if desired. The AC grid and the load 5 may also be electrical connected allowing the load to consume electrical power from the AC grid, e.g. in case, the photovoltaic system does not produce and/or store amount of electrical power in amount needed.

The control system 3 is configured for, by controlling the current direction through the bidirectional DC-to-DC converter 2, providing a current drain from current flowing from the photovoltaic panel (8) to the DC-to-AC converter and charging the electrical storage 4. This current drain is effectuated if the power delivered by the DC-to-AC converter is larger than the load and the state of charge (SOC) of the electrical storage (3) is smaller than 100% or is smaller than a predefined maximum state of charge (SOC) setting point. If the state of charge is 100% or higher than the predefined maximum state of charge setting point, the photovoltaic system may temporarily be set out of duty or power produced fed into the AC grid 6 (if connected to a grid 6). The predefined maximum state of charge setting point is defined as preferably 75%, such as 80%, preferably 90%.

In another mode of operation of the photovoltaic system, the controller 3 determines the state of charge (SOC) of the electrical storage 4 and the amount of power consumed by the load 5 from the AC grid 6. The controller 3 is configured to provide a surplus of current to the current flowing from the photovoltaic panel 8 to the DC-to-AC converter 7 by setting the current direction of the bidirectional DC-to-DC converter 2 to discharge the electrical storage 4, if and/or as long as the state of charge is larger than zero or larger than a predefined minimum state of charge (SOC) setting point.

The state of charge of the electrical storage 4 is typically provided by a sensor providing a control signal representing the stage of charge and this control signal is input to control system 3.

In a further mode of operation of the photovoltaic system, the controller 3 determines a power-balance of the system, by calculating the amount of current required by the system and the amount of current supplied by the output terminal (8.1) of the photovoltaic panel (8), such that the electrical storage 4 is set to be charged/discharged depending on the value of power-balance.

Figure 6:
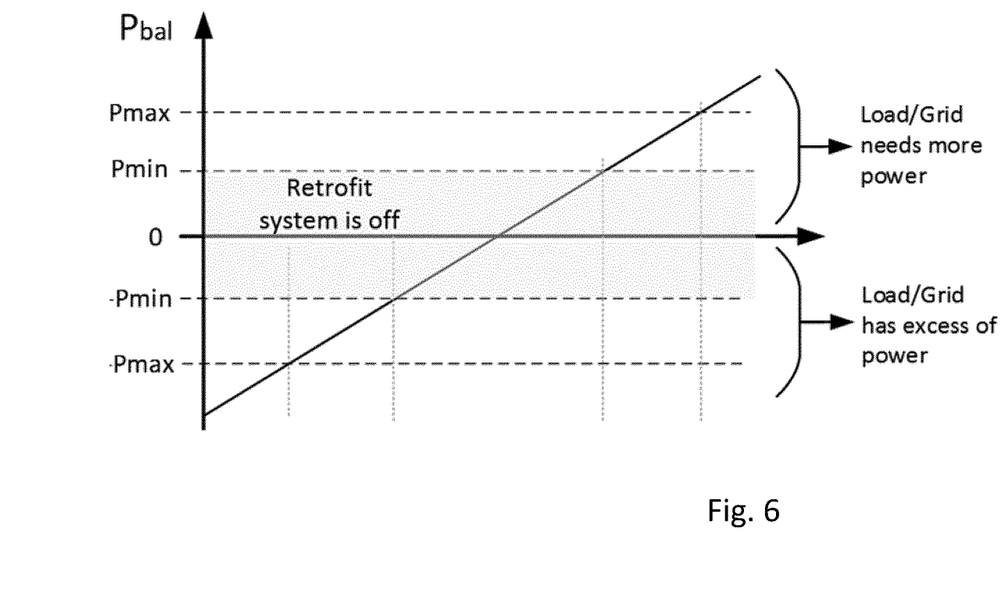
FIG. 6 illustrates one aspect of the use of the controller for when to charge/discharge the electrical storage depending on a power-balance of the photovoltaic system.

As illustrated in FIG. 6, an example of how such a power-balance system correlation with reference to discharge/charge the electrical storage 4 operates is shown. Based on predefined power-balance minimum values, the system will be switched off/on by the controller 3.

The controller 3 is further configured to discharge the electrical storage (4) if the power-balance is larger than zero or/and larger than the predefined power-balance minimum or charge the electrical storage (4) if the state of charge (SOC) is lower than 100% or is smaller than a predefined maximum state of charge (SOC) setting point and the power-balance of the system is less than zero or/and less than predefined power-balance minimum.

As illustrated in FIG. 1, the output terminal 8.1 of the photovoltaic panel 8 is in electrical connection with the input terminal 7.1 of the DC-to-AC converter 7 by an electrical connection 9. The first terminal 2.1 of the bidirectional DC-to-DC converter 2 is electrical connected with said electrical connection 9. This can be established e.g. by an electrical lice providing a very easy retrofitting of an energy storage facility in already existing photovoltaic systems.

The bidirectional DC-to-DC converter 2, the energy storage 4 and control system 3 may be seen as forming an energy storage system 1. These three components (include any peripheral equipment) may form a unit and can be locally retrofitted on a photovoltaic power production facility.

It is advantageous to determine the current through the bidirectional DC-to-DC converter and in order to accomplish this, the control system 3 is configured to determine current at the first and/or second terminal of the bidirectional DC-to-DC converter 2.1, 2.2. This is typically provided by use of a current sensor providing a control signal representing the current and inputting this to the control system.

Figure 3:
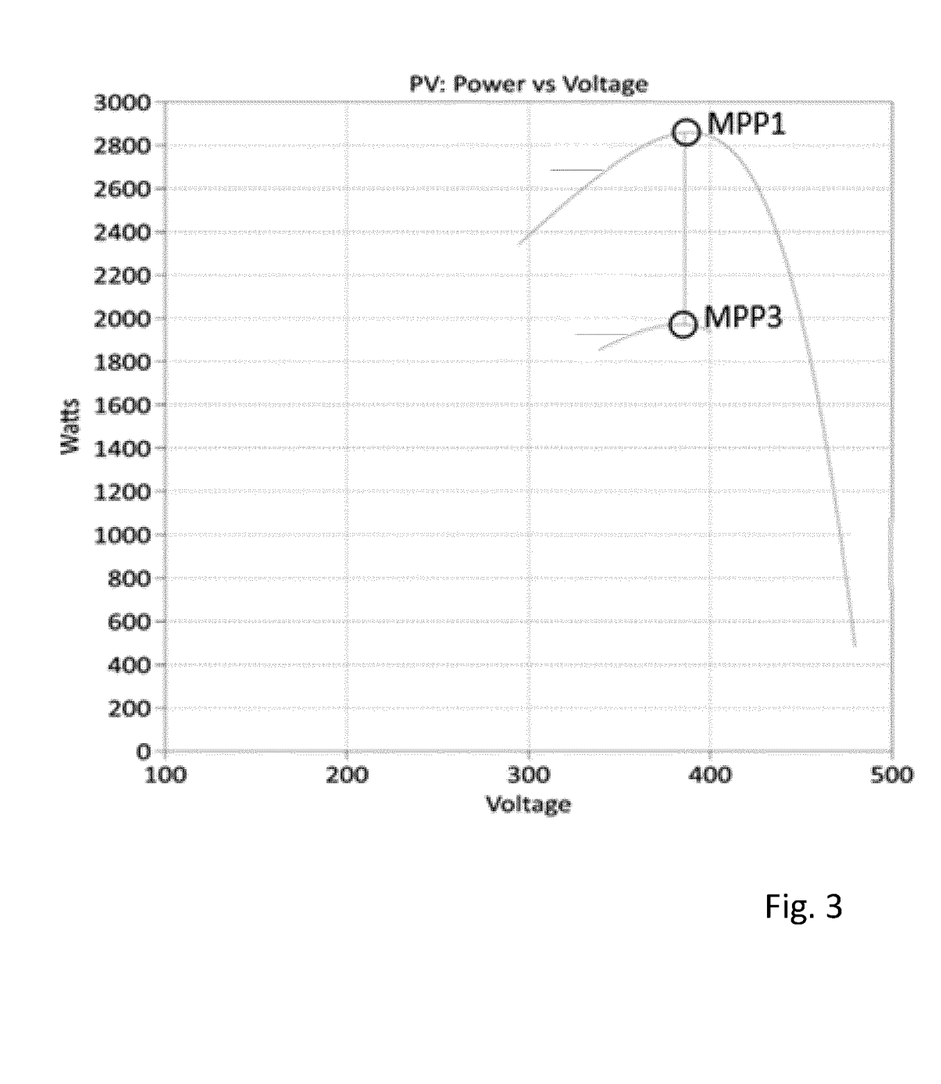
FIG. 3 is an example of a V-P curve from the photovoltaic panel(s)
Figure 4:
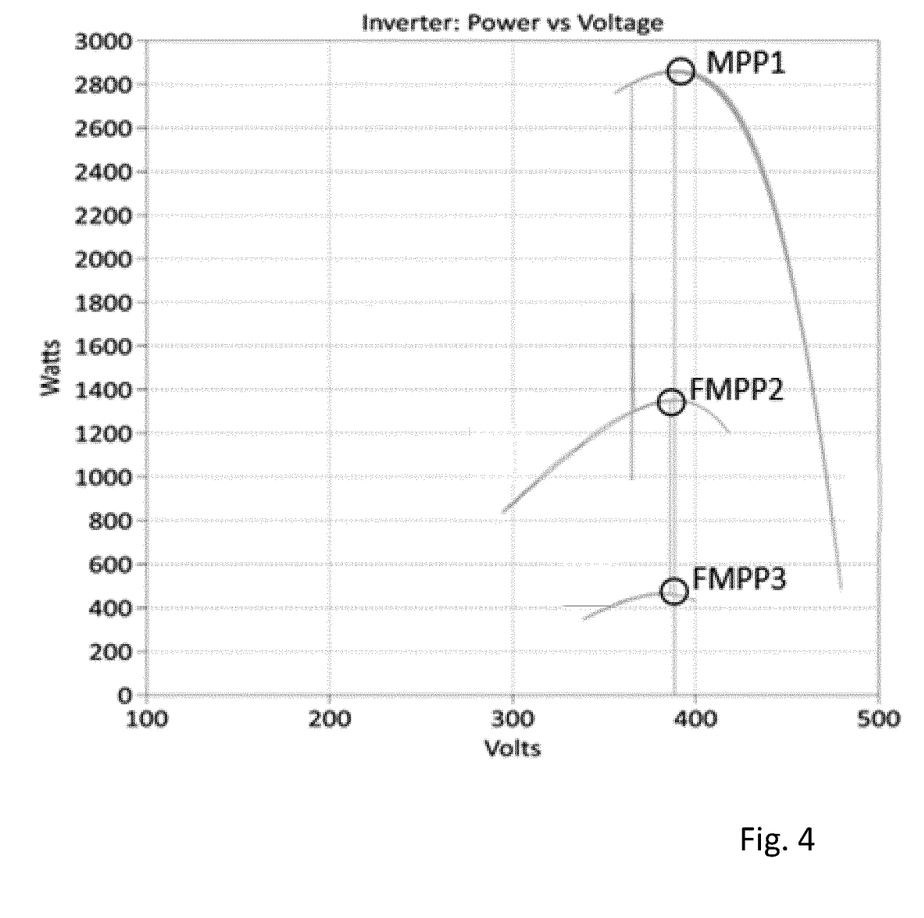
FIG. 4 is an example of a V-P curve from the DC-to-AC converter.
Figure 5:
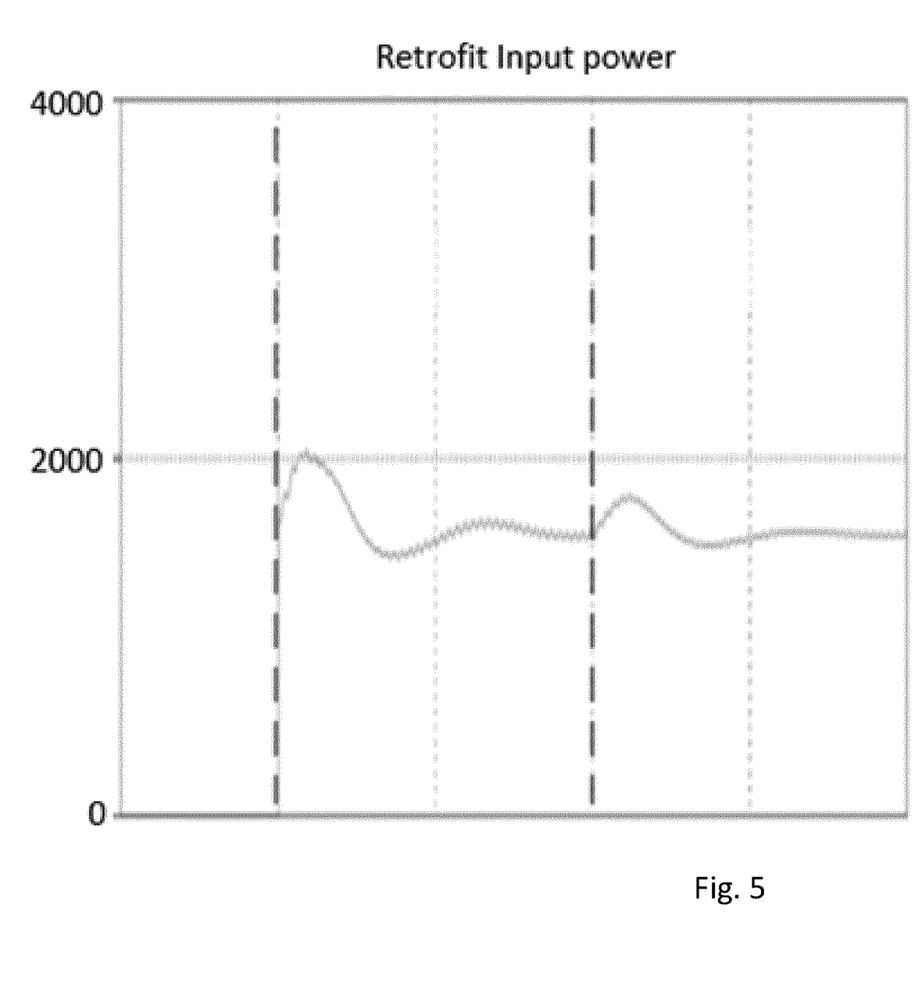
FIG. 5 is an example of charging an electrical storage by illustrating the change of input power with reference to time.

As illustrated in FIG. 3, one example of the invention is shown by running a charging operation, where the DC-to-AC converter is set to perform MPPT control and proportionality is shown between the V-P curve of the PV panels as illustrated in FIG. 3, the V-P curve of the inverter as illustrated in FIG. 4, and the charging/discharging current of the battery as shown in FIG. 5.

In a specific example, the demand from the load 5 is equal to the supply from the PV panel(s) 8. The PV panel(s) 8 produce 2.8 kW as shown as MPP1 in FIG. 3, and the demand from the load 5 is 2.8 kW. In this specific example, the input power to the electrical storage 4 is 0 kW, which is shown in the first part of FIG. 5. Thus, the input power into the DC-to-AC converter 7 is 2.8 kW as shown in FIG. 4.

In another specific example, the demand from the load 5 is smaller than the supply from the PV panel(s) 8. In this specific example, the PV panel(s) 8 produce 2.8 kW as shown as MPP1 in FIG. 3, and the demand from the load 5 is 1.3 kW. Consequently, 1.5 kW is directed as input power into the electrical storage 4, as shown in the mid-section of FIG. 5, and 1.3 kW is directed as input power into the DC-to-AC converter 7 as shown as FMPP2 in FIG. 4.

In another specific example, the demand from the load 5 is smaller than the supply from the PV panel(s) 8. In this specific example, the PV panel(s) 8 produce 2.0 kW as shown as MPP3 in FIG. 3, and the demand from the load 5 is 500 W. Consequently, 1.5 kW is directed as input power into the electrical storage 4, as shown in the last-section of FIG. 5, and 500 W is directed as input power into the DC-to-AC converter 7 as shown as FMPP3 in FIG. 4.

The invention can be implemented by means of a combination of hardware and software, such as firmware. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

LIST OF REFERENCE SYMBOLS USED

1 Local energy storage (LES)
2 Bidirectional DC-to-DC converter
2.1 First terminal of bidirectional DC-to-DC converter
2.2 Second terminal of bidirectional DC-to-DC converter
3 Control system
4 Electrical storage
5 Load, such as a household
6 AC grid
7 DC-to-AC converter
7.1 Input terminal of DC-to-AC converter
7.2 Output terminal of DC-to-AC converter
8 Photovoltaic panel
8.1 Output terminal of photovoltaic panel
9 Electrical connection

The invention claimed is:

1. A photovoltaic system comprising
   a photovoltaic panel having an output terminal for outputting current produced by the photovoltaic panel;
   a DC-to-AC converter having an input terminal for inputting DC current and an output terminal for outputting AC current;
   a bidirectional DC-to-DC converter having a first terminal for in-/outputting DC current and a second terminal for in-/outputting DC current;
   an electrical storage;
   a control system;

wherein:
the output terminal of the photovoltaic panel is in electrical connection with the input terminal of the DC-to-AC converter, the DC-to-AC converter being configured for extracting power from a photovoltaic panel based on a maximum power point tracking (MPPT) algorithm;
the first terminal of the bidirectional DC-to-DC converter is electrical connected with the photovoltaic panel and with the DC-to-AC converter, and the second terminal of the bidirectional DC-to-DC converter is electrically connected with the electrical storage, so as to provide a current drain from or a current surplus to a current flowing from the photovoltaic panel to the DC-to-AC converter by either charging or discharging the electrical storage through the bidirectional DC-to-DC converter;
the bidirectional DC-to-DC converter is configured for controlling a current direction based on a control signal from the control system and the control system is configured to determine the power delivered by DC-to-AC converter, and configured to determine the power delivered to a load electrically connectable at the output terminal and based on the determinations, assuring that the power is delivered at the output terminal of the DC-to-AC converter by controlling the current direction through the bidirectional DC-to-DC converter to either charge or discharge the electrical storage, so that:
if the electrical storage has a state of charge larger than a predetermined discharging setting point, and the power delivered to the load is larger than the power delivered by the DC-to-AC converter then discharge the electrical storage;
if the electrical storage has a state of charge smaller than a predetermined charging setting point and the power delivered by the DC-to-AC converter is larger than the power delivered to the load then charge the electrical storage;
wherein, the bidirectional DC-to-DC converter is controlled during charging and discharging of the electrical storage in manner so that voltage potential at the first terminal is set to be essentially equal to the voltage potential at the output terminal of the photovoltaic panel.

2. The photovoltaic system according to claim 1, wherein a bandwidth of the bidirectional DC-to-DC converter is larger than a bandwidth of the maximum power point tracking (MPPT) algorithm.

3. The photovoltaic system according to claim 1, wherein the output terminal of the DC-to-AC converter is electrically connected to a load, the load comprising a household.

4. The photovoltaic system according to claim 1, wherein the control system is further configured, by controlling the current direction through the bidirectional DC-to-DC converter, to provide a current drain from current flowing from the photovoltaic panel to the DC-to-AC converter and charge the electrical storage, if the power delivered by the DC-to-AC converter is larger than power consumed by the load, and the state of charge (SOC) of the electrical storage is smaller than 100%, or is smaller than a predefined maximum SOC setting point.

5. The photovoltaic system according to claim 1, wherein the output terminal of the DC-to-AC converter is electrically connectable to an AC grid, the AC grid comprising a supply grid.

6. The photovoltaic system according to claim 5, wherein the bidirectional DC-to-DC converter is configured to:
determine the state of charge (SOC) of the electrical storage;
determine an amount of power consumed by the load from the AC grid; and
provide a surplus of current to the current flowing from the photovoltaic panel to the DC-to-AC converter by setting the current direction of the bidirectional DC-to-DC converter to discharge the electrical storage, if the state of charge is larger than zero and/or larger than a predefined minimum state of charge (SOC) setting point and power is consumed by the load from the AC grid.

7. The photovoltaic system according to claim 6, wherein the bidirectional DC-to-DC converter is configured to:
determine a power-balance of the photovoltaic system, by calculating the amount of current required by the photovoltaic system and the amount of current supplied by the output terminal of the photovoltaic panel;
discharge the electrical storage if the power-balance is larger than zero or/and larger than a predefined power-balance minimum; and
charge the electrical storage if the state of charge (SOC) is lower than 100% or is smaller than a predefined maximum state of charge (SOC) setting point and the power-balance of the photovoltaic system is less than zero or/and less than predefined power-balance minimum.

8. The photovoltaic system according to claim 7, wherein the output terminal of the photovoltaic panel is in electrical connection with the input terminal of the DC-to-AC converter by an electrical connection and wherein the first terminal of the bidirectional DC-to-DC converter is electrical connected with the electrical connection.

9. The photovoltaic system according to claim 1, wherein the output terminal of the photovoltaic panel is in electrical connection with the input terminal of the DC-to-AC converter by an electrical connection and wherein the first terminal of the bidirectional DC-to-DC converter is electrical connected with the electrical connection.

10. The photovoltaic system according to claim 9, wherein the bidirectional DC-to-DC converter, the photovoltaic system forms an energy storage system locally retrofitted on a photovoltaic power production facility.

11. The photovoltaic system according to claim 10, wherein the control system is configured to determine current at the first and/or second terminal of the bidirectional DC-to-DC converter.

12. A method for controlling the photovoltaic system according to claim 11, the method comprising:
determining by use of the control system the power delivered by DC-to-AC converter,
controlling the current direction in the bidirectional DC-to-DC converter to either charging or discharging the electrical storage to assure the power delivered.

13. A method for controlling the photovoltaic system according to claim 1, the method comprising:
determining by use of the control system the power delivered by DC-to-AC converter,
controlling the current direction in the bidirectional DC-to-DC converter to either charging or discharging the electrical storage to assure the power delivered.

14. The photovoltaic system according to claim 1, wherein the bidirectional DC-to-DC converter, the photovoltaic system forms an energy storage system locally retrofitted on a photovoltaic power production facility.

15. The photovoltaic system according to claim 1, wherein the control system is configured to determine current at the first and/or second terminal of the bidirectional DC-to-DC converter.

\* \* \* \* \*